United States Patent [19]

Daifuku et al.

[11] Patent Number: 4,717,634
[45] Date of Patent: Jan. 5, 1988

[54] ELECTRIC CELLS UTILIZING POLYANILINE AS A POSITIVE ELECTRODE ACTIVE MATERIAL

[75] Inventors: Hideharu Daifuku; Tadashi Fuse, both of Kodaira; Masao Ogawa, Kawagoe; Yoshitomo Masuda, Kodaira; Shinichi Toyosawa, Tokorozawa; Ryota Fujio, Akigawa, all of Japan

[73] Assignee: Bridgestone Corporation, Tokyo, Japan

[21] Appl. No.: 920,140

[22] Filed: Oct. 17, 1986

[30] Foreign Application Priority Data

| Oct. 17, 1985 | [JP] | Japan | 60-232046 |
| Oct. 21, 1985 | [JP] | Japan | 60-236027 |
| Nov. 6, 1985 | [JP] | Japan | 60-249492 |
| Feb. 14, 1986 | [JP] | Japan | 61-28880 |
| Feb. 20, 1986 | [JP] | Japan | 61-36232 |
| Apr. 2, 1986 | [JP] | Japan | 61-77453 |

[51] Int. Cl.$^4$ .............................. H01M 6/14
[52] U.S. Cl. ........................... 429/213; 429/194
[58] Field of Search ............ 429/213, 212, 194, 192

[56] References Cited

U.S. PATENT DOCUMENTS

| 4,547,439 | 10/1985 | Geniees | 429/213 X |
| 4,629,540 | 12/1986 | Geniees et al. | 429/213 X |

FOREIGN PATENT DOCUMENTS

| 0221964 | 11/1985 | Japan | 429/213 |
| 0249265 | 12/1985 | Japan | 429/213 |

Primary Examiner—Anthony Skapars
Attorney, Agent, or Firm—Birch, Stewart, Kolasch & Birch

[57] ABSTRACT

An electric cell comprises a positive electrode, a negative electrode and an electrolytic solution, characterized in that a positive active material of the positive electrode is a polyaniline, a negative electrode active material of the negative electrode is lithium or a lithium alloy containing $4\times 10^{-3}$ to $170\times 10^{-3}$ mol of effective lithium which is capable of electrochemical occlusion and release upon charging and discharging per g of the polyaniline used as the positive electrode active material, and said electrolytic solution is an non-aqueous electrolytic solution containing an electrolyte of more than 1 mol/l to less than 6 mol/l in a non-aqueous solvent.

6 Claims, 6 Drawing Figures

ELECTRIC CELLS UTILIZING POLYANILINE AS A POSITIVE ELECTRODE ACTIVE MATERIAL

BACKGROUND OF THE INVENTION

1. Field of the Invention

The present invention relates to an electric cell which utilizes a polyaniline as a positive electrode active material, lithium or a lithium alloy as a negative electrode active material, and a non-aqueous electrolyte as an electrolyte.

2. Description of the Prior Art

Electric cells comprising lithium as a negative electrode active material have hitherto been known to be those having high energy densities and high discharge voltages. In such cells, non-aqueous electrolytes, such as non-aqueous electrolytic solutions containing an electrolyte dissolved in a non-aqueous solvent, have usually been utilized as electrolytes in order to stabilize their cell performance under the conditions of high energy densities and high discharge voltages.

Recently, electric cells utilizing organic polymeric materials have been developed for the purpose of miniaturizing cells, reducing their weights and/or improving their flexibility. In particular, there have been a great number of attempts to apply organic electroconductive polymeric materials such as polyanilines to electric cells as electrode active materials. When polyanilines are utilized as electrode active materials of electric cells, those having excellent cell performance can be obtained: that is, secondary cells comprising polyanilines may have larger charge and discharge capacities and better cycle life as compared with those utilizing other organic electroconductive polymeric materials. Accordingly, polyanilines among organic electroconductive polymeric materials are expected to be most promising electrode active materials for practical use in electric cells.

Thus, it has been expected that high performance electric cells with good functions can be obtained if polyanilines are utilized as positive electrode active materials of electric cells a which comprise lithium as negative electrode active materials a and non-aqueous electrolytes.

However, electric cells utilizing polyanilines as electrode active materials have not become practical due to the reasons that such cells have higher internal resistance and shorter cycle life as compared to electric cells using conventional inorganic materials as electrode active materials. Particularly, such disadvantages will be more serious if polyanilines are utilized as positive electrode active materials in secondary lithium cells having high energy densities and high discharge voltages.

Such secondary lithium cells may be described in more detail: Li secondary cells can be charged and discharged repeatedly, have excellent cell performance such as a high energy density and a discharge potential, and are able to be miniaturized and reduced in their weight. Therefore, attempts to apply such secondary Li cells to various uses have been greatly achieved.

On the other hand, a demand for secondary cells which are small in size and can endure 1,000 to 2,000 cycles of charge and discharge at discharge capacity of at least 1 mAH, as secondary cells for memory backup of personal computer ICs, has been increasing as personal computers and game instruments using such computers have become routine.

In order to attain good durability upon use over a longer period and/or more repeated cycles of charge and discharge, there are attempts made to prevent the formation of lithium dendrite during the charge and discharge cycles by utilizing a lithium alloy such as LiAl instead of lithium as a negative electrode active material of a secondary cell. However, such excellent durability upon repeated charge and discharge cycles has not been attained yet.

SUMMARY OF THE INVENTION

It is an object of the present invention to provide a lithium cell comprising a polyaniline as a positive electrode active material which has high cell performance such as low internal resistance or long cycle life and permits the construction of electric cells with high energy densities and high discharge voltages.

According to the present invention, there is provided an electric cell comprising a positive electrode, a negative electrode and an electrolytic solution, characterized in that a positive electrode active material of the positive electrode is a polyaniline, a negative electrode active material of the negative electrode is lithium or a lithium alloy containing $4 \times 10^{-3}$ to $170 \times 10^{-3}$ mol of effective lithium which is capable of electrochemical occlusion and release upon charging and discharging per g of the polyaniline used as the positive electrode active material, and said electrolytic solution is a non-aqueous electrolytic solution containing an electrolyte of more than 1 mol/l to less than 6 mol/l in a non-aqueous solvent.

According to the electric cell of the invention, by utilizing as the positive electrode active material a polyaniline and as the negative electrode active material lithium or a lithium alloy containing $4 \times 10^{-3}$ to $170 \times 10^{-3}$ mol of effective lithium which is capable of electrochemical occlusion and release upon charging and discharging per g of the polyaniline used as the positive electrode active material and by using a non-aqueous electrolytic solution containing an electrolyte of more than 1 mol/l to less than 6 mol/l in a non-aqueous solvent, the above object can be effectively attained. In addition, miniaturization of electric cells, reduction of cell weight and improvement of flexibility may be realized.

The present invention covers various embodiments: The electric cells of the present invention can be formed into small-sized electric cells such as coin-form cells and cylindrical cells or can be used to construct secondary cells. Accordingly, the electric cells are suitable for a large number of applications: for example, portable machines such as automobiles, electric automobiles, airplanes and watches; memory backups for personal computer ICs; and others.

Heretofore, when electric cells are constructed, the concentrations of electrolytes in non-aqueous electrolytic solutions contained in the cell have been set at 1 mol/l or less. The reason is as follows: when $LiClO_4$ or $LiBF_4$ is used as an electrolyte and propylene carbonate is used as a solvent, the electric conductivity at room temperature becomes maximum at concentrations slightly lower than 1 mol/l and therefore such concentrations are advantageous for the electric conductivity.

According to the results of the investigations by the present inventors, however, there were some problems when secondary cells were constructed by employing polyanilines as positive electrodes, lithium or lithium alloys as negative electrode, and non-aqueous electrolyte solution having concentrations of 1 mol/l or lower: thus, the discharge capacity and energy density were not sufficient; the cycle life of charge and discharge was poor; and especially, the cell performance was significantly decreased in small-sized secondary cells, such as coin-form and cylindrical secondary cells, in which the amount of the electrolytic solution was limited to lower values.

The present inventors have further studied and found that, in order to construct secondary cells having high discharge capacity and energy density as well as excellent cycle life of charge and discharge, it is important that the amount of the electrolytic solution is as low as possible and the concentration of the electrolytes in a non-aqueous electrolytic solution is more than 1 mol per 1 liter of the electrolytic solution. By maintaining the concentration of the electrolytes in the electrolytic solution to higher than 1 mol/l but lower than 6 mol/l, satisfactorily excellent electric cells, particularly small-sized secondary cells such as coin-form and cylindrical cells can be formed. The present invention has been completed by the above findings.

BRIEF DESCRIPTION OF THE ACCOMPANYING DRAWINGS

The above-described and other objects, features and advantages of the present invention will be more apparent by the following description with reference to the drawings.

DETAILED DESCRIPTION OF THE INVENTION

Figure 1:
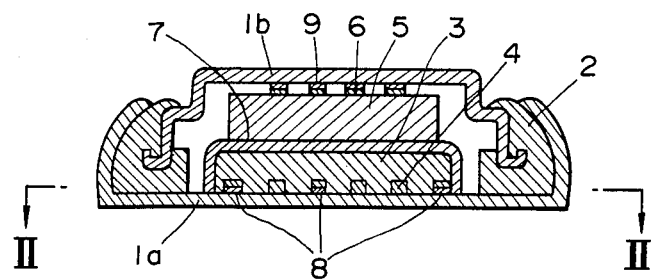
FIG. 1 is a schematic cross-sectional view of one embodiment of the electric cells according to the present invention.

The electric cell of the present invention comprises a positive electrode, a negative electrode and an electrolytic solution.

In the present invention, a polyaniline is used as a positive electrode active material of the positive electrode.

As the polyaniline, one having a water content of 10,000 ppm or less, particularly 1,000 ppm or less, more particularly 500 ppm or less, is preferably used because of improving the cell performance.

More detailedly, the present inventors have made great efforts to investigate effects of water present in electric cell systems on the cell performance, wherein non-aqueous lithium secondary cells are constructed by employing a lithium-containing negative electrode and a non-aqueous electrolyte. Consequently, in such non-aqueous lithium secondary cells there have been found that water present in the cell system adversely affects the current efficiency, cycle life, internal resistance, self discharge or float life under the floating conditions, due to the especially high cell voltage; that accordingly, when polyanilines are used as positive electrode active materials, it is preferable to reduce the water content of the polyaniline as low as possible; and that in such cases, the water content of polyanilines is significant since they are synthesized in an aqueous system.

As shown in the experiments described hereinafter, the present inventors investigated the properties of secondary cells constructed by using as a positive electrode a polyaniline which was synthesized by electrolytic oxidative polymerization and heated to dry under reduced pressure, an Al-Li alloy as a negative electrode, and a non-aqueous electrolytic solution in which an electrolyte and a non-aqueous solvent had been well purified to reduce the water content of the solution to or below 8 ppm. Even in the electric cells thus carefully constructed, the current efficiency was not so high, and the cell performance was lowered as the charge and discharge were repeated; that is, the cycle life was not so long. Hitherto, polyanilines prepared by oxidative polymerization or other methods have been heated to dry under reduced pressures prior to practical use. According to the investigations of the present inventors, the polyanilines, even after drying in such a manner as described above, will contain 50,000 to 60,000 ppm or more of water, and accordingly, the remaining water in the polyaniline may adversely affect the cell performance even if the water content of the electrolytic solution is carefully controlled.

The present inventors have further investigated the system and finally found that if the water content of polyanilines is 10,000 ppm or less, non-aqueous lithium secondary cells using such a polyaniline as a positive electrode active material may provide satisfactorily good cell performance, i.e., both the internal resistance and cycle life, even at higher energy densities and higher discharge voltages.

As described above, it is preferred to use the polyanilines having a water content of 10,000 ppm or less, particularly, 1,000 ppm or less, more particularly 500 ppm or less. However, polyanilines prepared by electrolytic oxidative polymerization, thoroughly washed with distilled water, and dried at room temperature for one day will usually have 50,000 to 60,000 ppm or more water content. It is difficult to reduce the water content to or below 10,000 ppm, particularly 1,000 ppm by such a drying method. Even though heat treatment is effected at 50° C. under a reduced pressure of 1 mmHg for two days, the desired water content cannot be attained. In order to reduce the water content of polyanilines to or below 10,000 ppm, it is preferred to subject the polyanilines prepared by electrolytic oxidative polymerization or optionally dried at room temperature after the preparation to one or a combination of two or more of the following dehydrating treatments (1) to (4).

(1) Dehydrating Treatment with Moisture Absorbing Compounds

This method comprises dipping polyanilines into a non-aqueous solvent containing a moisture absorbing compound to dehydrate the polyanilines by utilizing the moisture absorption power of the compound. The moisture absorbing compounds may include, for example, fine powdery or porous moisture absorbing compounds such as alumina, molecular sieve, silica and the like; chemical desiccating agents such as calcium chloride, calcium oxide, potassium carbonate and the like. The non-aqueous solvents used in the dehydrating treatment may include non-aqueous solvents similar to those used as solvents for electrolytic solutions of secondary cells described hereinafter, non-aqueous solvents which are easy to remove or distill off, such as methanol, ethanol, acetone and the like. One or more of these non-aqueous solvents may be used. There is no particular limitation in the procedures of the dehydrating treatment utilizing the moisture absorption power of the compounds; optionally, heating, stirring etc. can be utilized. The amount of the moisture absorption compound(s) in the non-aqueous solvent(s) is preferably in the range of from 5 to 80% by weight. The period of time for dipping polyaniline in the solvent is preferably in the range of from 1 hour to 20 days.

(2) Dehydrating Treatment by Heating under Vacuum

This method comprises heating to dehydrate polyanilines under high vacuum of 0.1 mmHg or less. There is no particular limitation in the heating temperatures and periods of time. Preferably, the heating temperature is in the range of from 50° to 200° C., and the period of time for heating under vacuum in the range of from 1 hour to 10 days.

(3) Electrochemically Dehydrating Treatment

This method comprises electrochemically removing water contained in polyanilines. A working electrode of polyaniline is subjected to charging and discharging or de-doping (i.e., to remove dopes contained therein) in a dehydrated non-aqueous electrolytic solution while employing a counter electrode of an electrode material having the ability to occlude and release cations, for example, an alkali metal or an alkali metal-containing alloy. Another method that a working electrode of polyaniline is retained at a discharging potential is also employed. The treating conditions including the period of time are not particularly limited. Preferably, the treatment is carried out for 1 hour to 10 days.

(4) Dehydrating Treatment Utilizing Soxhlet Extraction Method

This method comprises utilizing Soxhlet's extractor to extract the water contained in polyanilines. Thus, a water soluble non-aqueous solvent, such as methanol, ethanol, acetone or the like, is heated under reflux in a Soxhlet's extractor in which a polyaniline material is placed. The treating conditions including the period of time are not particularly limited. Preferably, the treatment is carried out for 5 hours to 20 days.

The above methods (1) to (4) are also effective for improving the efficiency of charge and discharge of cell and prolonging the cell life since impurities other than water may also be removed.

In the present invention, polyanilines are preferably prepared at first by electrolytic oxidative polymerization. In this case, an anode and a cathode are immersed into an electrolytic solution containing aniline monomer and electrolytic oxidative polymerization is effected to deposit polyanilines on the anode. The polyanilines may be then treated by the above-mentioned method(s) to reduce the water content to or below 10,000 ppm. The thus treated polyanilines are preferably used as a positive electrode active material to construct cells.

Preferably, a polyaniline film produced in the electrolytic polymerization may be used as it is without exfoliating the film from the anode used in the electrolytic polymerization: Thus, the polyaniline film is used as an electrode active material of a cell while the anode used in the electrolytic polymerization is utilized as it is as a current collector or a vessel (container) of the cell. Therefore, such a combination is preferably used as an integrated material of electrode-collector or vessel. There can thus be obtained secondary cells of low internal resistance which permit simplification of the process for preparing cells, easy miniaturization and thinning.

Prior to the present invention, a polyaniline film obtained by electrolytic polymerization has been exfoliated from the anode and attached to another collector to construct a cell electrode which has generally been utilized as an electrode of a secondary cell. Thus, the preparation of such a cell using the conventional polyaniline film requires additional procedures of exfoliating the polyaniline film and attaching the film to another collector; in other words, the process for constructing such a cell is complicated. The internal resistance of such a cell is larger due to an increase of the resistance at the interface when the polyaniline film is attached to another collector. Further, the cell structure constructed by attaching the polyaniline film to another collector and placing it in a vessel restricts the miniaturization and thinning of cells.

On the contrary, if a polyaniline film is used without exfoliating it from the anode substrate, the resulting composite, in which a polyaniline film is formed on the anode material and the anode and the polyaniline film are well adhered to and integrated each other, can be used as a cell material as it is without exfoliating the polyaniline film from the anode. In these cases, the polyaniline film is used as a positive electrode while the anode substrate as a collector or vessel. Thus, an electrode and a collector or vessel are integrated. In such an integrated cell, the internal resistance is significantly lower as compared with secondary cells using polyanilines prepared by conventional methods. Such a cell has good productivity since the process for constructing the cell can be simplified. Moreover, small-sized and/or thin secondary cells can be constructed from such integrated materials.

There is no particular limitation on the anode substrate materials, provided that they are electroconductive and insoluble in the electrolytic solution during the charging and discharging process of the cell. There may be used metal foils, net-like metals and expanded metals of metallic materials excellent in corrosion resistance, such as stainless steel, nickel, aluminum, platinum and the like, as well as carbonaceous thin layers. Preferred material is stainless steel substrate.

When stainless steel is used, good adhesion of polyaniline films to the substrate can be obtained. The stainless steel substrate is not corroded by an acidic aqueous solution of aniline used for electrochemically synthesizing polyanilines while using the substrate as an anode. Further, the substrate can well withstand the oxidation and/or reduction conditions of cells.

The stainless steel is not necessarily limited to particular ones. Austenitic stainless steel is preferred because of the anti-corrosion properties to the acidic solution used in the electrolytic polymerization of polyanilines, lower internal resistance when the resulting composite is used in secondary cells, and the performance as a collector or vessel. More particularly, austenitic stainless steels to which 1 to 10% of molybdenum has been added are preferred. Illustrative examples of stainless steel compositions include, but are not limited to, alloy compositions such as SUS 316 containing in addition to iron, 16-18% Cr, 10-14% Ni, 2-3% Mo, and other elements, SUS 317 containing in addition to iron, 18-20% Cr, 11-15% Ni, 3-4% Mo, and other elements, and the like.

When the anode substrate is used as it is as a collector or vessel of a cell, the shape of the substrate may suitably be chosen according to the purpose of the use, the kind of cells to be constructed, and other factors. Net- or thin plate-form substrates with a thickness of 1 to 1,000 $\mu$m, particularly 10 to 500 $\mu$m are preferably used, since miniaturization and thinning of cells are thereby assured. When the substrate is to be used as a collector, a net- or thin plate-form substrate, in particular a net-form substrate in respect of effective utilization of electrode active materials and flexibility, is preferred. When the substrate is to be used as a vessel, it is preferably in thin plate-form.

As described above, the polyanilines used as the positive electrode active materials may be made by deposition on an anode from an acidic electrolytic polymerization solution containing an aniline monomer in the progress of electrolytic polymerization. There is no particular limitation on the electrolytic polymerization solution and electrolytic polymerization conditions for synthesizing polyaniline films. Preferably, the electrolytic polymerization solution contains borofluoric acid, perchloric acid or the like. The use of such an acid is preferable with respect to the charging and discharging properties of electric cells in which the obtained polyanilines are used as the positive electrode active material since anion species of electrolytes used in the electric cells are usually the same as or similar to those of these acids. Also, the use of such an acid is preferred with respect to the synthesis of polyanilines by electrolytic polymerization since the polyaniline films can be formed on the substrate, particularly a stainless steel substrate with good adhesion. As to the compositions of the electrolytic polymerization solutions, the concentration of aniline is 0.01 to 5 mol/l, preferably 0.5 to 3 mol/l, and the concentration of the acid is 0.02 to 10 mol/l, preferably 1 to 6 mol/l. The temperature of the solution for electrolytic polymerization is preferably in the range of 0° to 30° C. with respect to the synthesizing rate of polyanilines and the complete prevention of corrosion of stainless steel when using it as an anode substrate. Particularly preferred are temperatures of 20° C. or lower since good film formability of polyanilines is obtained.

When the integrated composites of polyanilines and positive electrode collectors which may be obtained as described above are used as positive electrodes in the electric cells of the present invention, it is preferable to fix the positive electrode collector to an outer sheath vessel or container in the integrated form.

Generally, a positive electrode of polyaniline is electrically connected to the outer sheath vessel or container of a cell through a metallic collector in cells using polyanilines as positive electrodes. According to the present inventor's knowledge, however, the electric connection between the polyaniline and the collector or between the collector and the outer sheath vessel or container sometimes becomes poor, resulting in impossible charging and discharging since the polyaniline expands and contracts during the charging and discharging process in these cells.

This phenomenon is described in more detail hereinbelow: In the secondary cells in which a positive electrode of a composite comprising a positive electrode collector integrated with polyaniline as described above is simply inserted into an outer sheath vessel or container, the polyaniline expands by incorporating thereinto anions in the electrolyte during the charging process and contracts by releasing the anions into the electrolyte during the discharging process. Thus, the volume of the polyaniline changes by the electrochemical doping and de-doping reactions during the charging and discharging process of the polyaniline. Therefore, although in the secondary cells comprising such a polyaniline as a positive electrode active material the positive electrode collector is strongly pressed onto the outer sheath vessel or container by the expansion of the polyaniline in the charged state and, accordingly, electric contact is good, poor electric contact is generated between the positive electrode collector and the outer sheath vessel or container by the contraction of the polyaniline as the discharging proceeds, resulting in a decrease of the electrical connection between the positive electrode collector and the outer sheath vessel or container and abrupt increase of the internal resistance in the secondary cell. Such a phenomenon is most often observed in small-sized electric cells such as coin-form cells and button-type cells.

On the other hand, if the positive electrode collector constituting the integrated material together with the polyaniline is fixed to the outer sheath vessel or container, the problem of poor electric contact between electrodes and outer sheath vessels or container observed in the prior art can be solved, electric connection may be assured stably over a long period of time resulting in sufficient prevention of poor electric contact, the internal resistance is not abruptly increased during operation, and accordingly secondary cells excellent in cycle life can be obtained. Thus, various improvements may be made.

Methods for fixing and integrating the positive electrode collector to the outer sheath vessel or container are not particularly limited, provided that good electroconductivity and ohmic connection between the collector and the outer sheath vessel or container are assured in spite of the volume change of polyaniline during charging and discharging process, in particular the contraction upon discharging. Various fixing and integrating methods may be mentioned: for example, a collector and an outer sheath vessel or container are adhered by an electroconductive adhesive in which a metallic powder is dispersed, are soldered, or are bonded by welding. In particular, it is preferred to weld a collector to an outer sheath vessel or container in order to obtain strong adhesion. More preferably, spot welding, laser welding and TIG palace welding are utilized since fine working is possible and small-sized electric cells such as coin-form cells and button-type cells can be formed.

In order to obtain a cell with higher performance, it is preferable to fix and integrate a collector to an outer sheath vessel or container as described above, prior to charging i.e., before the polyaniline incorporates anions to expand or under discharging conditions.

In the present invention, the negative electrode of the electric cell comprises lithium or a lithium alloy as the negative electrode active material. In this case, a lithium alloy is preferred with respect to prevention of occurrence of lithium dendrite.

As a lithium alloy, one in which the amount of lithium effective for effecting electrochemical occlusion and release and being involved in the charging and discharging process ranges from $4 \times 10^{-3}$ mol to $170 \times 10^{-3}$ mol, particularly from $4 \times 10^{-3}$ mol to $130 \times 10^{-3}$ mol, per g of the polyaniline as a positive electrode active material is used.

More detailedly, considering that lithium secondary cells using a lithium alloy such as LiAl as a negative electrode active material are effective to prevent the generation of dendrite upon the charging and discharging process, the present inventors have diligently investigated the lithium secondary cells using a lithium alloy as a negative electrode active material. Consequently, a simple combination of a polyaniline as a positive electrode active material with a lithium alloy as a negative electrode active material could not give a level of durability that enables repeated charging and discharging of at least 1,000 to 2,000 cycles at a discharge capacity of 1 mAH although some improvement of the durability on repeated charging and discharging could be obtained.

As a result of the further investigations, the present inventors have found that in secondary cells using a polyaniline as a positive electrode active material and a lithium alloy as a negative electrode active material, the effective amount of lithium in the lithium alloy which effects the electrochemical occlusion and release during the charging and discharging process is an important factor for determining the durability. Thus, by controlling properly the amounts of the positive and negative electrode active materials, i.e., by adjusting the effective amount of lithium as above described to a value in the range of $4 \times 10^{-3}$ mol to $170 \times 10^{-3}$ mol per g of polyaniline as the positive electrode active material, there can be obtained desirable secondary cells having excellent durability: in such cells, the polyaniline used as the positive electrode active material and the lithium alloy used as the negative electrode active material are hardly degraded upon use for a long period or a large number of repeated charging and discharging cycles; further, small-sized electric cells comprising such a polyaniline and a lithium alloy will satisfactorily give the aforementioned level of durability. Accordingly, there can be provided a secondary cell which may preferably be used as a memory backup in personal computer ICs.

When a secondary cell is constructed, if the effective amount of lithium is below $4 \times 10^{-3}$ mol, the charging and discharging voltage gradually increases and the discharging power decreases with the increase of the number of charging and discharging cycles, and the polyaniline of the positive electrode active material may be eluted and the secondary cell may be degraded before the desirable durability level is attained. The reasons why such phenomena are caused are not clearly understood but it may be considered that charge is accumulated in the polyaniline as the number of charging and discharging cycles increases since the Coulomb efficiency of the negative electrode comprising a lithium alloy is poorer as compared to that of the positive electrode comprising polyaniline. When the effective amount of lithium is above $170 \times 10^{-3}$ mol, the charging and discharging capacity unstably increases or decreases before the desirable durability level is attained, and the electrolyte solution or lithium alloy may decompose to degrade the secondary cell. In both cases, there may be caused disadvantages: for example, a small-sized secondary electric cell which has excellent durability to repeated charging and discharging, that is, permits 1,000 to 2,000 cycles of repeated charging and discharging at a discharging capacity of 1 mAH cannot be formed. Thus, amounts of lithium departing from the above-specified range are not preferable with respect to the cell performance.

When lithium alloys are used as negative electrode active materials in the electric cells of the present invention, the kinds of such lithium alloys and processes for preparing them are not particularly limited, provided that the lithium alloys contain the aforementioned effective lithium, i.e., the lithium capable of effecting electrochemical occlusion and release and being involved in charging and discharging process. For example, such lithium alloys may be prepared by electrochemically occluding lithium in one or more metals capable of being alloyed with lithium, or by alloying lithium by metallurgy method in which lithium and one or more metals capable of being alloyed with lithium are heated to melt under a vacuum or an inert gas atmosphere and mixed monogeneously each other, followed by cooling to solidify. Such lithium alloys may be either homogeneous or heterogeneous. In the latter case, only the surface of metal capable of being alloyed with lithium is alloyed with lithium.

It should be noted that the metal capable of being alloyed with lithium includes Al, Ag, Pb, Sn, Bi, In, Cd, Zn, Sb, Tl and Mg. These metals are used singly or in combination. Examples of the lithium alloy may be Li-Al, Li-In, Li-Bi-Pb, Li-Bi-Pb-Cd, Li-Sn-Pb, Li-Sn-Sb-Cd, Li-Sn-Cd, Li-Sn-Pb-Zn, Li-Bi-Pb-Mg and Li-Sn-Bi-Mg. Among them, Li-Al is most preferred with respect to prevention of occurrence of lithium dendrite and workability on rolling which is required for the manufacture of electric cells.

When the lithium alloys are electrochemically prepared, it is preferable to use an electrolytic solution having a stable region at potentials of 1.2 V or lower v.s. Li/Li+ with respect to the cell performance including the durability and efficiency of the resulting electric cells. More detailedly, the durability of lithium secondary cells during the repeated charging and discharging process may depend on the properties of the lithium alloy as a negative electrode active material. Prior to the present invention, no significant consideration has been given to the electrolytic solutions used in the electrochemical production of lithium alloys. According to the findings of the present inventors, however, the properties of lithium alloys may vary depending on the kinds of the electrolyte and solvent in the electrolytic solutions. Thus, the present inventors have found that lithium alloys obtained by employing an electrolytic solution having a stable region in which no decomposition occurs at particular potentials, i.e., 1.2 V or lower (v.s. Li/Li+), have very excellent properties suitable for negative electrode active materials of secondary cells, and that such secondary cells using these lithium alloys are excellent in the charging and discharging property.

The electrolytic solutions used in the preparation of such lithium alloys should have a stable region where foreign materials such as decomposed products are not generated, at potentials of 1.2 V (v.s. Li/Li+) or less, preferably 0.7 V or less, but other properties of the solutions are not particularly limited. Preferred electrolytic solutions may comprise one or more electrolytes selected from LiClO$_4$, LiCF$_3$SO$_3$ and LiPF$_6$ dissolved in one or more solvents selected from propylene carbonate, tetrahydrofuran, dimethoxyethane, γ-butyrolactone, dioxolan, hexamethylphoshoramide, sulfolane, dimethyl sulfoxide, and dimethylformamide.

On the contrary, when lithium alloys are electrochemically prepared in an electrolytic solution which is unstable at low potentials of 1.2 V (v.s. Li/Li$^+$) or lower, decomposition products of materials to be electrolyzed or solvents may adhere to the lithium alloys. If such lithium alloys are used as negative electrode active materials of secondary cells, the cell performance of the resulting cells including cycle life and efficiency will be poor.

Concentrations of such electrolytic solutions used in the preparation of the lithium alloys will vary depending on the solubility of the electrolyte used in the selected solvent, electrolytic conditions, and the like, and cannot be limited to particular ranges. In the preferred methods for preparing the lithium alloys, lithium is used as a counter electrode while a metal capable of forming a desired lithium alloy, for example, aluminum, magnesium, mercury, zinc, cadmium or the like is used as a working electrode. Preferably, the current density of the working electrode may be set at 30 mA/cm$^2$ or lower, particularly 3 mA/cm$^2$ or lower.

In the present invention, the negative electrode may preferably be integrated with an outer sheath vessel or container. Such an integrated form of the negative electrode and an outer sheath vessel (container) is preferred with respect to miniaturization, thinning and productivity of cells as well as cell performance such as lowered internal resistance, long life and high energy density.

Heretofore, in order to assure the electrical contact of an electrode with an outer sheath vessel or container, a current collector such as a mesh is formed, or a spring-like structural member is provided, between the electrode and the outer sheath vessel or container. However, when a lithium alloy is employed as a negative electrode active material, the negative electrode may be broken during the production of cells since the lithium alloy is brittle, or the electrical contact of the negative electrode with the outer sheath vessel or container may become poor and consequently the internal resistance of the cell may increase during the operation of the cell. In particular cases of secondary cells, the internal resistance of the cell increases as the charging and discharging cycle is repeated, resulting in the lowering of the charging and discharging properties and sometimes charging and discharging may be impossible. Further, since a collector should be formed or a spring-like structural member should be provided, the process for constructing cells may be complicated, and such a collector or spring-like structural member may interfere with miniaturization or thinning of cells.

By integrating an outer sheath vessel or container with a negative electrode comprising a lithium alloy as a negative electrode active material, the problem of poor electrical contact can be solved and the internal resistance can be kept at a low level. Thus, when a secondary cell constructed by employing such an integrated form is subjected to repeated charging and discharging, an increase of the internal resistance due to poor electrical contact is not caused and accordingly the charging and discharging properties can be maintained for a long period of time. Furthermore, the process for preparing such cells may be simplified and miniaturization and thinning of cells may be easy to carry out.

There is no particular limitation on methods for integrating so long as a negative electrode and an outer sheath vessel or container can be integrated. Various methods for obtaining a composite in which a negative electrode and an outer sheath vessel or container are integrated may be used according to the kinds of materials of negative electrode substrates and outer sheath vessels or container. For example, a lithium alloy prepared preliminarily can be bonded to and integrated with an outer sheath vessel or container. However, when a negative electrode comprising a lithium alloy is bonded to an outer sheath vessel or container, the electrode may be broken during the bonding process since lithium alloys are brittle. It is preferable to employ, as a negative electrode substrate, the aforementioned metal which is excellent in formability and capable of being alloyed with lithium, for example, aluminum, indium, zinc or the like. Such a negative electrode substrate is first bonded to an outer sheath vessel or container and then alloyed with lithium. It is particularly preferred to use a metal to be alloyed with lithium as the material of an outer sheath vessel or container and to alloy part of the vessel directly with lithium since the bonding process can be simplified and thinner cells can be constructed.

Any suitable method for bonding a negative electrode or negative electrode substrate to an outer sheath vessel or container may be employed; adhesion, welding, soldering or the like can be used depending on materials, shapes, sizes and the likes. When a metal capable of being alloyed with lithium is utilized in a negative electrode substrate or an outer sheath vessel (container) and such a substrate or vessel is alloyed with lithium, preferred methods may comprise masking portions other than the negative electrode portion so that the only electrode portion may be alloyed with lithium, applying a current to the negative electrode portion according to the aforementioned electrochemical process in an organic solvent in which a lithium salt is dissolved and a counter electrode of lithium metal is immersed, and thereby alloying the portion with lithium while controlling the alloying degree by the quantity of the current. The partially lithium-alloyed negative electrode substrate may be integrated with an outer sheath vessel or container which is preferably made of the same metal as the substrate or the metal capable of easy adhesion, welding or soldering with the substrate.

The electric cells of the present invention comprises a non-aqueous electrolytic solution. The non-aqueous electrolytic solutions used in the electric cells according to the present invention may comprise an electrolyte and a non-aqueous solvent as essential components.

The electrolytes are compounds composed of anions and cations. Illustrative examples of anions may include halide anions of the group VA elements, such as $PF_6^-$, $SbF_6^-$, $AsF_6^-$, and $SbCl_6^-$; halide anions of the group IIIA elements, such as $BF_4^-$ and $AlCl_4^-$; halogen anions, such as $I^-$ ($I_3^-$), $Br^-$, and $Cl^-$; perchlorate anions, such as $ClO_4^-$; $HF_2^-$; $CF_3SO_3^-$; $SCN^-$; $SO_4^-$; $HSO_4^-$; and the like. The anions are not limited to these. Illustrative examples of cations may include, but are not limited to, alkali metal ions, such as $Li^+$, $Na^+$, and $K^+$; alkaline earth metal ions, such as $Mg^{2+}$, $Ca^{2+}$, and $Ba^{2+}$; $Al^{3+}$; quaternary ammonium ions represented by the formula: $R_4N^+$ where R is a hydrogen atom or a hydrocarbon radical; and the like.

Illustrative examples of electrolytes comprising such anions and cations may include $LiPF_6$, $LiSbF_6$, $LiAsF_6$, $LiClO_4$, $LiI$, $LiBr$, $LiCl$, $NaPF_6$, $NaSbF_6$, $NaAsF_6$, $NaClO_4$, $NaI$, $KPF_6$, $KSbF_6$, $KAsF_6$, $KClO_4$, $LiBF_4$, $LiAlCl_4$, $LiHF_2$, $LiSCN$, $KSCN$, $LiSO_3CF_3$, $(n\text{-}C_4H_7)_4NAsF_6$, $(n\text{-}C_4H_7)_4NPF_6$, $(n\text{-}C_4H_7)_4NClO_4$, $(n\text{-}C_4H_7)_4NBF_4$, $(C_2H_5)_4NClO_4$, $(n\text{-}C_4H_7)_4NI$ and the like. Among these, $LiClO_4$ and $LiBF_4$ are especially preferred, but the electrolytes constituting the above said non-aqueous electrolytic solutions are not limited to these compounds.

There is no particular limitation on the non-aqueous solvents constituting the said non-aqueous electrolytic solutions so long as they are non-aqueous, but relatively highly polar solvents may preferably be used. Illustrative examples of the solvents may include propylene carbonate, ethylene carbonate, benzonitrile, acetonitrile, tetrahydrofuran, 2-methyltetrahydrofuran, γ-butyrolactone, triethyl phosphate, triethyl phosphate, dimethyl sulfate, dimethylformamide, dimethylacetamide, dimethyl sulfoxide, dioxane, dimethoxyethane, polyethylene glycol, sulfolane, dichloroethane, chlorobenzene, nitrobenzene, and any mixture thereof. Among these, propylene carbonate, dimethoxyethane, tetrahydrofuran or γ-butyrolactone, or any mixture thereof is particularly preferred.

The non-aqueous solid electrolytes which may be used in the electric cells of the present invention include organic solid electrolytes comprising polyethylene oxides, polypropylene oxides, crosslinked polyethylene oxides with isocyanate, or phosphagen polymers having ethylene oxide oligomer side chains, these polymers being impregnated with the aforementioned non-aqueous electrolytic solutions; inorganic ionic conductors such as $Li_3N$ and $LiBCl_4$; inorganic solid electrolytes, for example, lithium glass such as $Li_4SiO_4$ and $Li_3BO_3$; and the like.

In the present invention, the water content of the non-aqueous electrolyte media is preferably as low as possible. The non-aqueous electrolyte media may preferably have a water content of 50 ppm or less, particularly 10 ppm or less.

As described above, in the electric cells according to the present invention, the concentration of electrolytes in the electrolytic solutions should be in the range of from more than 1 mol/l to less than 6 mol/l, especially from 2 to 3 mol/l, with respect to the cell performance and the formation of small-sized secondary electric cells.

If the concentration of electrolyte in the electrolytic solution is 1 mol/l or lower, it may appear that cells may advantageously be constructed since the apparent solvent resistance is low and the electric conductivity is high. When a secondary cell is practically constructed, however, the reaction resistance is larger during the electrochemical reactions where cations and anions, i.e., charge carriers, are reversibly exchanged between electrodes and the electrolyte; or, a relatively large amount of the electrolytic solution may be required to assure the necessary amount of electrolytes. Thus, the charging and discharging capacity and energy density may be lowered in the secondary cell, and it will be disadvantageous for the construction of small-sized cells such as coin-form and cylindrical electric cells.

If the concentration of electrolyte in the electrolytic solution is 6 mol/l or higher, it may appear theoretically that small-sized electric cells may advantageously be constructed since the amount of electrolytic solutions to be required for the charging and discharging can be reduced. However, the viscosity of the electrolytic solution will extremely increase and the solution resistance will be high; thus, like the cases where solid electrolytes are used, the cell current density during charging and discharging is strictly restricted, the charging and discharging efficiency is reduced, or the cycle life of the secondary cell is shortened.

Accordingly, concentrations of electrolytes in the electrolyte solutions of 1 mol/l or less or 6 mol/l or more are not practical from the viewpoint of cell performance.

The electric cells of the present invention may usually be constructed by interposing the non-aqueous electrolytic solution between a positive electrode and a negative electrode. Optionally, a porous membrane made of a synthetic resin such as polyethylene or polypropylene, or a natural fiber paper can be placed between the positive and negative electrodes and used as a separator.

Figure 2:
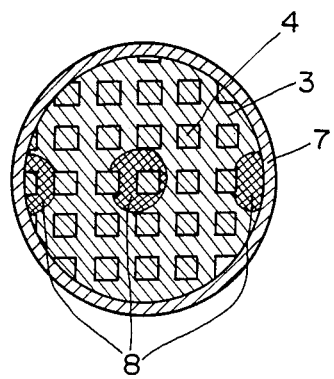
FIG. 2 is a principal cross-sectional view taken along II—II line in FIG. 1.
Figure 3:
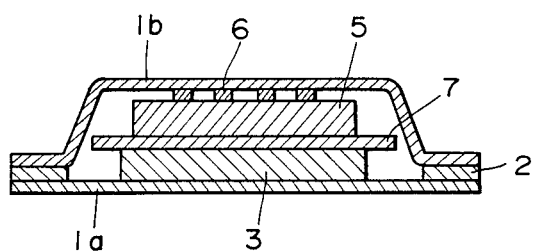
FIG. 3 is a schematic cross-sectional view of another embodiment of the electric cells according to the present invention.

Various forms of secondary cells may be possible in the present invention: for example, such a cell structure as shown in FIGS. 1 to 3 can be formed. In FIGS. 1 and 2, a polyaniline film constitutes a positive electrode and a stainless steel substrate constitutes a positive electrode collector, said film and said substrate comprising a composite. In FIG. 3, the polyaniline film of said composite is used as a positive electrode while the substrate is used as part of a container. In these figures, the electric cell comprises a container 1a, 1b, a gasket 2, a positive electrode 3, a positive electrode collector 4, a negative electrode 5, a negative electrode collector 6, and a separator 7 which is impregnated with an electrolyte. Such a cell structure enables the construction of thinner ones; for example, 1 to 5 mm in thickness in the cells as shown in FIGS. 1 and 2, or 0.1 to 5 mm in thickness in the cells as shown in FIG. 3. In particular, when a substrate constituting a composite is used as a container, ultra-miniaturized, thinner cells can be constructed since the substrate acts as a collector at the same time and therefore no other collector is necessary to provide.

In the cell shown in FIGS. 1 and 2, a pair of outer sheath vessels 1a, 1b constituting a container, each being made of stainless steel, are fixed to each other through a gasket 2, and a positive electrode 3, a negative electrode 5, and an insulating separator 7 which is interposed between the two electrodes and carrys an electrolyte containing a dopant are placed within the outer sheath vessel 1a, 1b. A positive electrode collector 4 is the stainless steel mesh which has been used as an electrode during electrolytic polymerization and accordingly is adhered to and integrated with the polyaniline positive electrode 3. Further, the collector 4 is fixed to one of the outer sheath vessels (1a) by spot welding at 8. A negative electrode collector 6 of stainless steel mesh is spot welded to the negative electrode 5 of an Al-Li alloy and, on the other hand, is fixed to another outer sheath vessel 1b by spot welding at 9.

It should be noted that the cell construction is not limited to the above figures. Any cell constructions can be allowed in the scope of the present invention.

The following examples will be given by way of illustration of the present invention but are not construed as limiting thereof.

EXAMPLE 1

A coin-form secondary electric cell as shown in FIGS. 1 and 2 was constructed in a glove box with humidity being controlled by utilizing as a positive electrode 40 mg polyaniline which was obtained by electrolytically polymerizing aniline and dehydrating and drying under vacuum and a lithium metal as a negative electrode. The electrolytic solution comprised 3 mol/l LiBF$_4$ dissolved in a mixed solvent of equal volumes of propylene carbonate and dimethoxyethane.

Figure 4:
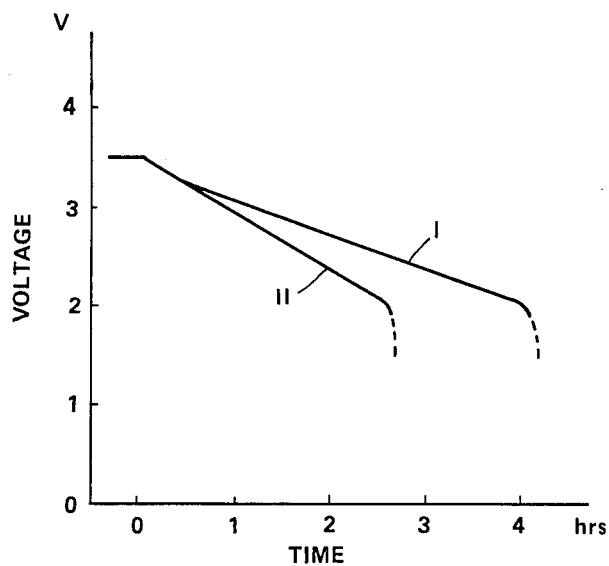
FIG. 4 is a graph showing the change of the discharge voltage of the secondary cells in Example 1 and Comparative Example 1 with the lapse of time.

The secondary cell was charged under the conditions of maximum voltage of 3.5 V and discharged at a constant current of 0.5 mA and the change of the discharge voltage with the course of time was measured. The results are shown in FIG. 4 as curve I.

The discharge capacity from the start of discharging to the discharge voltage of 2.5 V was determined as 4 mAH. This corresponded to 100 AH per kg of the polyaniline used in the positive electrode.

COMPARATIVE EXAMPLE 1

For the comparison, another secondary cell was constructed by the same procedures as in Example 1 except that the concentration of the electrolyte was 1 mol/l. The secondary cell was also subjected to the charging and discharging test under the same conditions as in Example 1 and the change of the discharge voltage with the course of time. The results are also shown in FIG. 4 as curve II.

The discharge capacity was determined as about 2.6 mAH which corresponded to 65 AH per kg of the polyaniline used in the positive electrode.

EXAMPLE 2

Similar secondary cells to that prepared in Example 1 were subjected to the cyclic charging and discharging test, wherein the charging and discharging was carried out at a current of 1 mA until reaching 1 mAH and the change of the resistance at the start of discharging in each cycle was measured.

The results are shown in Table 1.

The charging and discharging curve was stable during the cyclic charging and discharging test and the test were possible after 1,000 cycles.

EXAMPLE 3

A secondary cell was constructed by the same procedures as in Example 1 except that the electrolyte concentration was 5 mol/l.

A charging and discharging test similar to that performed in Example 2 was carried out by using this secondary cell.

The results are also shown in Table 1.

This secondary cell was also stable for a long period of time during the repeated charging and discharging, as in Example 2.

COMPARATIVE EXAMPLE 2

For the comparison, another secondary cell was constructed by the same procedures as in Example 1 except that the electrolyte concentration was 6 mol/l.

A charging and discharging test similar to that carried out in Example 2 was performed on this secondary cell. The results are also shown in Table 1.

In this secondary cell the internal resistance increased significantly and, owing to this increase of the resistance, the charging and discharging at voltages within the standard operational range at 300th cycle when the cycle test was terminated.

TABLE 1

|  | Example 2 | Example 3 | Comparative Example 2 |
|---|---|---|---|
| Concentration of Electrolyte (mol/l) | 3 | 5 | 6 |
| Resistance (ohm) |  |  |  |
| initial | 50–70 | 70–100 | 100–150 |
| 300 cycle | 70–90 | 100–120 | 300–500 |

EXAMPLE 4

An electrolytic solution containing 1 mol/l aniline and 2 mol/l HBF$_4$ was subjected to electrolytic polymerization with a constant current to synthesize polyaniline on a mesh substrate of SUS 316 stainless steel. The resulting polyaniline together with the substrate was thoroughly washed with distilled water, dried at room temperature for one day, and further dried under reduced pressure for 2 days.

Then, the polyaniline was subjected to electrochemical de-doping treatment using a lithium counter electrode in a solution of 3 mol/l LiBF$_4$ in propylene carbonate-dimethoxyethane (1:1 in volume). Thus, water remaining in the polyaniline was eliminated and the water content of the polyaniline was 380 ppm.

The thus treated polyaniline was used as a positive electrode active material to construct a coin-form electric cell as shown in FIGS. 1 and 2. The negative electrode active material of the cell was an Al-Li alloy with an atomic ratio of Al to Li of 2:1, and the amount of the effective lithium which is capable of electrochemical occlusion and release upon charging and discharging was $58 \times 10^{-3}$ mol per g of the polyaniline. It should be noted that the Al-Li alloy was prepared electrochemically by the method in which aluminum as a working electrode was electrically treated in a propylene carbonate solution containing 1 mol/l LiClO$_4$ by using a lithium counter electrode to alloy lithium with aluminum. The obtained Li-Al had an effective lithium concentration of $2.9 \times 10^{-3}$ mol.

The electrolytic solution of the cell was the same solution as that used in the above de-doping treatment, i.e. a solution of 3 mol/l LiBF$_4$ in propylene carbonate-dimethoxyethane (1:1 in volume). The constructed coin-form cell was 20 mm in diameter and 1.6 mm in thickness.

In the construction of the cell, the stainless mesh substrate used in the synthesis of polyaniline was directly utilized as a positive electrode collector 4. For this purpose, polyaniline was exfoliated from the positive electrode collector at points 8 to be spot welded so as to expose the stainless mesh, i.e., the positive electrode collector 4, at these points. The exposed stainless mesh at these points 8 to be spot welded was welded to an outer sheath vessel 1a by a spot welder.

The thus constructed coin-type electric cell was subjected to repeating charging and discharging at a current density of 0.28 mA/cm$^2$ and a voltage in the range of from at maximum 3.3 V to at minimum 2.3 V to measure the cycle life.

At 78th cycle the discharge capacity was a half of the initial value, but the internal resistance was not significantly increased.

EXAMPLE 5

An electrolytic solution which comprises an aqueous solution containing 1.5 mol/l aniline and 3.0 mol/l $HBF_4$ was electrolytically polymerized to deposit 50 mg polyaniline on a stainless mesh of 1.5 cm in diameter.

A current was applied to an aluminium disk of 1.5 cm in diameter and 300 μm in thickness in a solution of 1 mol/l $LiClO_4$ in propylene carbonate by using a lithium metal counter electrode. Thus, lithium was electrochemically alloyed to obtain a lithium-aluminium alloy having an effective lithium concentration of $2.9 \times 10^{-3}$ mol.

The polyaniline as a positive electrode active material and the stainless mesh as a positive electrode collector, the polyaniline and the stainless mesh being integrated, as well as the lithium-aluminium alloy as a negative electrode active material are placed in a stainless vessel. Further, an electrolytic solution containing 3 mol/l $LiBF_4$ in propylene carbonate-dimethoxyethane (1:1 in volume) and a separator comprising polypropylene paper were also placed in the vessel. The vessel was then sealed with a polypropylene gasket. Thus, a coin-form secondary cell of 1.6 mm in thickness and 2.0 cm in diameter was constructed.

The effective lithium concentration in the lithium-aluminium alloy corresponded to $58 \times 10^{-3}$ mol per g of the polyaniline used as positive electrode active material.

The coin-form electric cell was subjected to repeated charging and discharging test wherein one cycle consisted of charging at 1.0 mA for one hour and discharging at 1.0 mA for one hour. Even after 1,000 cycles, the cell voltage was not increased and normal charging and discharging was possible.

COMPARATIVE EXAMPLE 3

For the comparison, another coin-form electric cell was also constructed by almost same procedures as Example 5 except that the lithium-aluminium alloy used in Example 5 was substituted by a lithium-aluminium alloy having an effective lithium concentration of $1.0 \times 10^{-4}$ mol as a negative electrode active material. The effective lithium concentration in the lithium-aluminium alloy corresponded to $2 \times 10^{-3}$ mol per g of the polyaniline used as positive electrode active material.

This coin-form cell was also subjected to the charging and discharging test similar to that of Example 5. At the first repeated cycle, discharge at 1 mAH was impossible. Further discharge caused a gradual increase of the voltage. The charging and discharging was stopped at 115th cycle and the cell was analyzed. Elution of the polyaniline, a positive electrode active material, was observed and degradation of the cell significantly proceeded.

COMPARATIVE EXAMPLE 4

Moreover, a still another coin-form electric cell was also constructed for the comparison by almost same procedures as Example 5 except that the lithium-aluminium alloy used in Example 5 was substituted by a lithium-aluminium alloy having an effective lithium concentration of $9.0 \times 10^{-3}$ mol as a negative electrode active material. The effective lithium concentration in the lithium-aluminium alloy corresponded to $180 \times 10^{-3}$ mol per g of the polyaniline used as positive electrode active material.

This coin-form electric cell was also subjected to the charging and discharging test similar to that of Example 5. At 141st cycle, turbulence was observed in the charging and discharging curve. The test was terminated at 165th cycle and the electric cell was analyzed. Severe cracks of the negative electrode active material lithium-aluminium alloy were observed.

EXAMPLE 6

A lithium alloy $Li_{0.3}Al_{1.0}$ was prepared by applying a constant current of 0.5 mA/cm$^2$ to an electrolytic solution of 1 mol/l $LiClO_4$ in propylene carbonate in which an Al disk of 1.5 cm in diameter and 300 μm in thickness and a positive Li counter electrode were immersed. The electrolytic solution $LiClO_4$/propylene carbonate was stable at a potential of 0.7 V v.s. Li/Li$^+$.

The obtained lithium alloy was used as a negative electrode to construct a secondary cell in which a polyaniline (40 mg) of 1.5 cm in diameter was used as a positive electrode and an electrolytic solution comprised 2 mol/l $LiBF_4$ in propylene carbonate. The polyaniline electrode had been prepared by electrolytic polymerization of an aqueous solution comprising 1.5 mol/l aniline monomer and 3.0 mol/l $HBF_4$ by using a platinum plate as a substrate. The effective lithium concentration of the lithium alloy was $35 \times 10^{-3}$ mol per g of the polyaniline.

The thus prepared secondary cell was charged at a constant current of 0.5 mA for 2 hours and discharged at a constant current of 0.5 mA for 2 hours. The charging and discharging test comprising charging and discharging repeatedly in such a manner as immediately above described. The number of cycles until the discharge voltage decreased to 2 V or less was taken as a cycle life.

Figure 5:
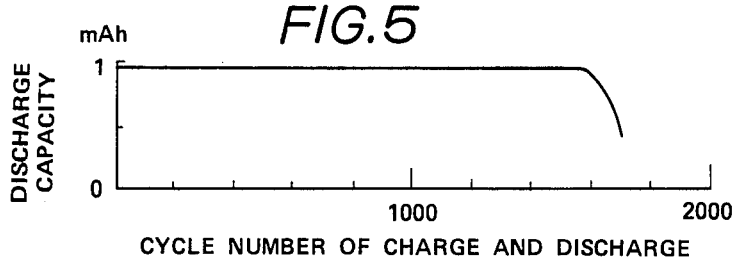
FIG. 5 is a graph showing the charge and discharge properties of the secondary cell of Example 6.

The result of the charging and discharging tests of Example 6 is shown in FIG. 5.

As seen from FIG. 5, the cycle life was 1725 cycles in Example 6. Accordingly, it is seen that cycle lives are improved and secondary electric cells having excellent charging and discharging properties may be obtained, by utilizing the lithium alloy electrodes.

EXAMPLE 7

An aluminium disk substrate of 1 cm in diameter and 200 μm in thickness was bonded to the inner surface of a stainless outer vessel by spot welding. The periphery of the disk-like aluminium substrate was masked with an insulating material. The aluminium disk substrate of the integrated aluminium substrate/outer sheath vessel was used as a working electrode so as to effect electrolysis at an applied current of 40 mAH while using a lithium metal as a counter electrode and a solution of 1 mol/l $LiClO_4$ in propylene carbonate as an electrolytic solution. Thus, the aluminium substrate was alloyed with lithium and a disk-like lithium-aluminium alloy was electrochemically prepared.

The thus prepared lithium-aluminium alloy which was integrated with the outer sheath vessel was used as a negative electrode to construct a coin-type electric cell of 1.6 mm in thickness, wherein the positive electrode of 1.5 cm in diameter comprised 40 mg polyaniline as a positive electrode active material, the electrolytic solution comprised a solution of 2 mol/l $LiBF_4$ in propylene carbonate, a polypropylene paper was used as a separator, and the positive electrode outer sheath vessel was sealed with a polypropylene gasket. The polyaniline used had been prepared on a platinum plate by electrolytic polymerization of an aqueous solution containing 1.5 mol/l aniline monomer and 3.0 mol/l HBF$_4$. The effective lithium concentration of the lithium-aluminum alloy was $37 \times 10^{-3}$ mol per g of the polyaniline.

The coin-like electric cell was subjected to the charging and discharging test wherein one cycle consisted of charging at 0.5 mA for 8 hours and discharging at 0.5 mA until the voltage reached 2.0 V. At each cycle the internal resistance was measured.

The internal resistance was about 40 ohms which did not change even after 20 cycles.

As seen from the above result, the electric cell using the lithium alloy integrated with the outer sheath vessel as a negative electrode active material had a sufficiently less internal resistance of the cell and showed an only slight change of the internal resistance during the repeated charging and discharging process, that is, were very stable.

EXAMPLE 8

Polyaniline was synthesized on a stainless steel mesh substrate as a positive electrode by constant current electrolytic oxidative polymerization of an aqueous solution containing 1 mol/l aniline monomer and 2 mol/l HBF$_4$. The resulting polyaniline together with the substrate was thoroughly washed with distilled water, dried at room temperature for one day, and further dried under a reduced pressure of about 1 mmHg for 2 days while heating to about 50° C. After drying, the water content of the polyaniline was quantitatively determined by Karl Fischer's method to be 56,000 ppm.

The polyaniline was immersed into dimethoxyethane to which molecular sieve 4A (Wako Jun-yaku Kogyo Kabushiki Kaisha, Japan) was added, and dehydrated for two weeks. After removing the solvent, the polyaniline was dried under a reduced pressure of about 1 mmHg for 10 hours while heating to about 50° C. After drying, the water content of the polyaniline was quantitatively determined by Karl Fischer's method to be 490 ppm.

The resulting polyaniline was further dehydrated electrochemically: the polyaniline with a water content of 490 ppm was used as a positive electrode, while metallic lithium was used as a negative electrode and a solution of 3 mol/l LiBF$_4$ dissolved in a mixed solvent of propylene carbonate and dimethoxyethane (1:1 in volume) which had been thoroughly dehydrated to a water content of 8 ppm or less was used as a non-aqueous electrolytic solution. Ten cycles of charging and discharging were effected at voltages in the range of from a maximum 4.0 V to a minimum 2.0 V and at a current density of 0.28 mA/cm$^2$. The water content of the resulting polyaniline was quantitatively determined by Karl Fischer's method to be 85 ppm.

The electric capacity of each (40 mg) of the polyanilines having different water contents was measured: one with a water content of 56,000 ppm was 3.7 mAH, another with a water content of 490 ppm was 4 mAH, and the other with a water content of 85 ppm was 4.1 mAH.

Using 40 mg of each of the three different polyanilines with different water contents as a positive electrode active material, three different secondary cells were constructed while employing a lithium-aluminum (Li-Al) alloy as a negative electrode and a non-aqueous electrolyte having a composition similar to that of the electrolytic solution used to electrochemically dehydrate the polyaniline as described above, i.e. a solution of 3 mol/l LiBF$_4$ in propylene carbonate-dimethoxyethane (1:1 in volume). The Li-Al alloy had been obtained on a working electrode of an aluminum disk of 200 μm in thickness and 15 mm in diameter by applying a current corresponding to a charge amount of 120 Coulomb to the working electrode and a Li metal counter electrode in an electrolytic solution having a composition similar to that of the non-aqueous electrolyte used in the secondary cell. The effective lithium concentration of the Li-Al alloy was $31 \times 10^{-3}$ mol per g of the polyaniline.

The internal resistance of each of the three different secondary cells was measured. The internal resistance of the secondary cell using as an electrode active material the polyaniline having a water content of 56,000 ppm was 200 ohms. On the contrary, the secondary cell using the polyaniline having a water content of 490 ppm or 85 ppm as an electrode active material had the internal resistances of 50 ohms or 30 ohms, respectively.

These secondary cells were repeatedly charged at a current density of 0.28 mA/cm$^2$ for 2 hours and discharged at a current density of 0.28 mA/cm$^2$ to investigate the cycle life of each cell which was determined by measuring the Coulomb efficiency (the ratio of the quantity of charge that was charged to the quantity of charge that was discharged) during repeated cycles of charging and discharging.

Figure 6:
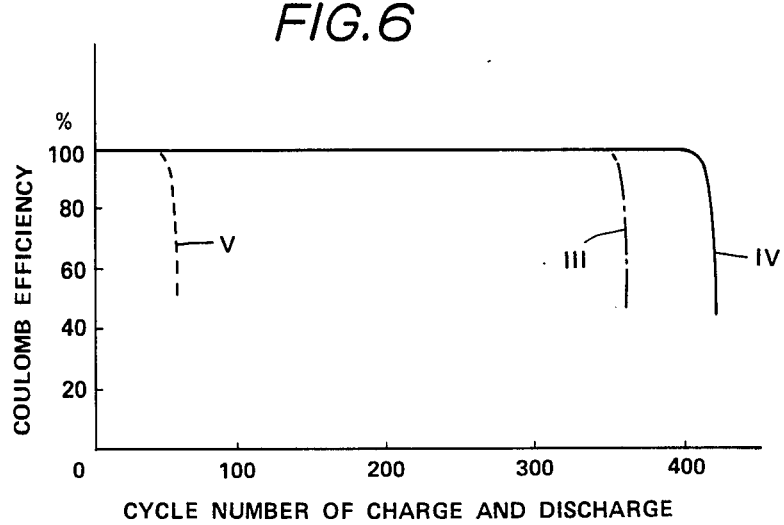
FIG. 6 is a graph showing the relation between the number of cycles of charge and discharge and the Coulomb efficiency (the ratio of the amount of charge to the amount of discharge) for the secondary cells using polyanilines having the different water contents.

The results are shown in FIG. 6.

As seen from FIG. 6, the cycle life of the secondary cell using the polyaniline having a water content of 490 ppm (curve III in FIG. 6) was 361 and that of the cell using the polyaniline having a water content of 85 ppm (curve IV in FIG. 6) was 420. However, the cycle life of the cell using the polyaniline having a water content of 56,000 ppm (curve V in FIG. 6) was 40.

Thus, it has been found that the secondary cells using polyanilines having water contents as little as possible apparent have lower internal resistances and longer cycles lives.

EXAMPLE 9

Electrolytic polymerization was effected by applying a constant current of 100 mA for one hour to an aqueous solution of 1 mol/l aniline and 2 mol/l borofluoric acid in which a mesh substrate, 4 cm $\times$ 2 cm $\times$ 90 μm in thickness, of molybdenum-containing austenitic stainless steel, SUS 316, as an anode and a lead plate as a cathode are immersed. Polyaniline thus electrochemically synthesized on the mesh substrate was then washed with water and dried. Thus, a mesh substrate on which a polyaniline film (23-25 mg/cm$^2$) was formed was obtained. The polyaniline was well adhered to the mesh substrate.

Then, the mesh substrate having the polyaniline film was cut into a predetermined size and an electric cell of 1.6 mm in thickness as shown in FIGS. 1 and 2 was constructed wherein the polyaniline as a positive electrode and the mesh substrate as a positive electrode collector were integrated. In the cell, a lithium negative electrode, an electrolytic solution of 3 mol/l LiBF$_4$ in propylene carbonate-dimethoxyethane (1:1 in volume), and a nonwoven polypropylene fabric as a separator which was impregnated with the electrolytic solution were used.

The secondary cell in which the polyaniline positive electrode and the SUS 316 mesh collector were integrated was subjected to the charging and discharging test at 1 mA and at a voltage in the range of 2 to 4 V. The results are as follows:

| | |
|---|---|
| open circuit potential during charging; | 4 V, |
| charging capacity per kg of polyaniline positive electrode; | 100 AH/kg, |
| internal resistance; | 100 ohm, |
| Coulomb efficiency during charging and discharging; | 98%. |

In this cell, the polyaniline film was well adhered to the SUS 316 mesh as mentioned above and such a composite could be directly used in the integrated form as a positive electrode-positive electrode collector composite. Thus, reduction of the number of steps for constructing electric cells and decrease of the internal resistance of the cells could be possible.

EXAMPLE 10

The procedures of Example 9 were repeated except that 2 mol/l borofluoric acid in the electrolytic solution for polymerization of Example 9 was replaced by 2 mol/l perchloric acid. Thus, 23 to 25 mg/cm$^2$ of polyaniline film was formed on the SUS 316 mesh substrate.

The integrated composite of the polyaniline film as a positive electrode and the mesh substrate as a collector was used to construct a secondary cell which was in turn tested for charging and discharging, as described in Example 9.

The values of cell properties such as the internal resistance in the charging and discharging test, and the Coulomb efficiency during the charging and discharging, were similar to those in Example 9. Further, the adhesion of the polyaniline to the mesh substrate was as well as in Example 9.

EXAMPLE 11

The back and periphery of a thin plate substrate (5 cm × 5 cm × 50 μm in thickness) of the same material (SUS 316) as Example 9 were covered with a masking. The resulting anode of 4 cm × 4 cm in electrode area was used while the similar cathode and same electrolytic solution for polymerization as in Example 9 were employed. Then, electrolytic polymerization was carried out at a constant current of 200 mA for one hour to electrochemically synthesize polyaniline on the thin plate substrate. The substrate with the polyaniline was then washed with water and dried. After removing the masking, there was obtained a composite of thin plate substrate on which a polyaniline film of 23 to 25 mg/cm$^2$ was formed. The resultant polyaniline was well adhered to the thin plate substrate.

The composite wherein the polyaniline film served as a positive electrode and the thin plate substrate serves as both a collector and a container, said polyaniline film and thin plate substrate being integrated in a body, was used to construct a cell of 0.5 mm in thickness as shown in FIG. 3. The negative electrode, electrolytic solution and material of the separator were similar to those used in Example 9.

The charging and discharging test was performed on the secondary cell as in Example 9. The results were similar to those obtained in Example 9.

In this electric cell, the adhesion between the polyaniline film and the SUS 316 thin plate was good and this composite could directly serve as an integrated positive electrode-container structure. Therefore, the elimination of some steps in the preparation of cells, the reduction of the internal resistance of cells, the decrease of the content volume, and the improvement of the energy density could be possible.

EXAMPLE 12

The procedures of Example 11 were repeated except that 2 mol/l borofluoric acid in the electrolytic solution for polymerization of Example 11 was replaced by 2 mol/l perchloric acid. Thus, a polyaniline film of 23 to 25 mg/cm$^2$ was formed on the SUS 316 thin plate substrate. A similar secondary cell was constructed in which a positive electrode of the polyaniline and a container of thin plate substrate were integrated, as described in Example 11. Further, the charging and discharging test of the cell was performed as in Example 11.

The cell properties, such as the internal resistance of the cell in the charging and discharging test, and the Coulomb efficiency during the charging and discharging process, were similar to those obtained in Example 11, and the adhesion of the polyaniline to the thin plate substrate was also good.

What is claimed is:

1. An electric cell comprising a positive electrode, a negative electrode and an electrolytic solution, wherein said positive electrode contains as an active material a polyaniline having a water content of 1000 ppm or less, said negative electrode contains as an active material lithium or a lithium alloy containing $4 \times 10^{-3}$ to $170 \times 10^{-3}$ mol of effective lithium which is capable of electrochemical occlusion and release upon charging and discharging per g of the polyaniline used as the positive electrode active material, and said electrolytic solution being a non-aqueous electrolytic solution containing an electrolyte of more than 1 mol/l to less than 6 mol/l in a non-aqueous solvent.

2. The electric cell according to claim 1, wherein the polyaniline is formed on a stainless steel substrate in the form of a film by electrolytic polymerization, the polyaniline is integrated with the stainless steel substrate, and the substrate constitutes a positive electrode collector or a container of said electric cell.

3. The electric cell according to claim 1, wherein the polyaniline is formed on a stainless steel substrate in the form of a film by electrolytic polymerization, the polyaniline is integrated with the stainless steel substrate, and the substrate constitutes a positive electrode collector which is fixed to a container of said electric cell.

4. The electric cell according to claim 1, wherein said lithium alloy is prepared electrochemically from an electrolytic solution having a stable region at potentials of 1.2 volt v.s. Li/Li$^+$ or less.

5. The electric cell according to claim 1, wherein said negative electrode is integrated with a container of said electric cell.

6. The electric cell according to claim 1, wherein the thickness of the polyaniline is 0.5 to 2 mm.

* * * * *